Figure 1:
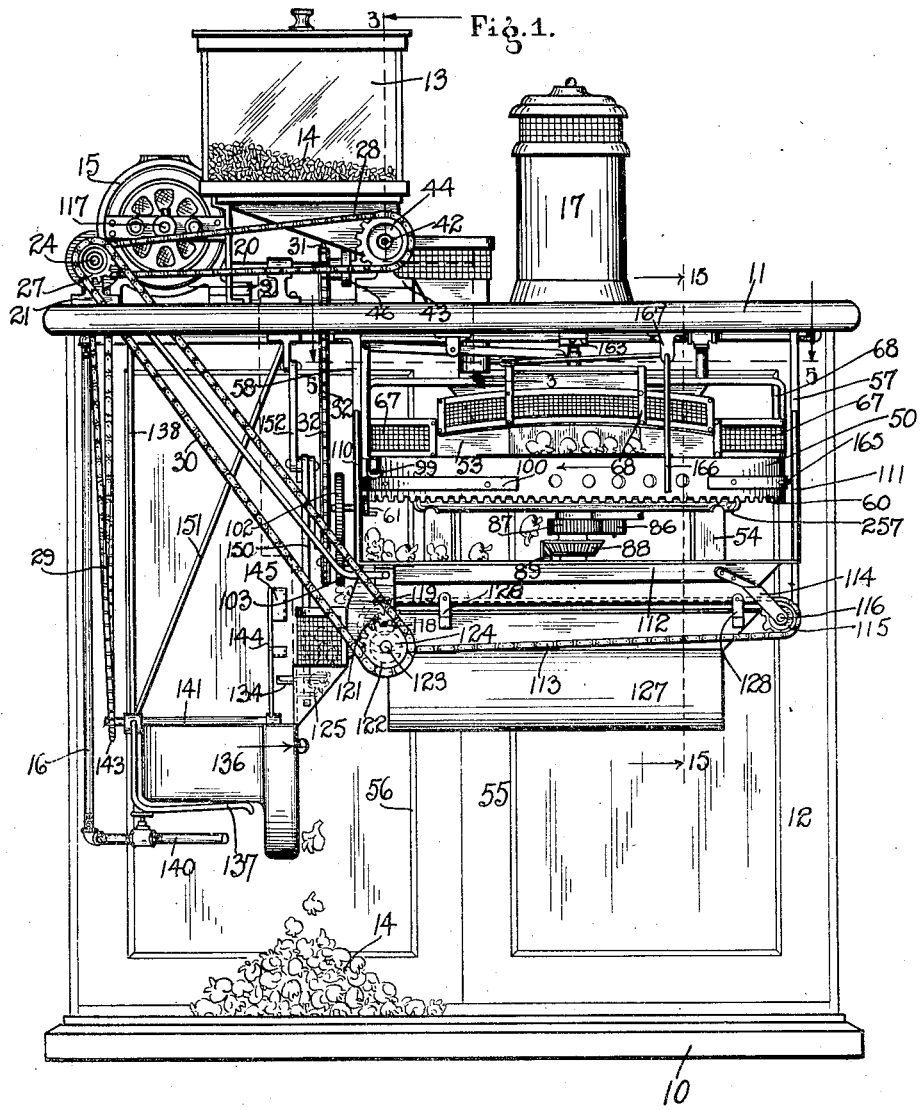

D. H. TALBERT.
CORN POPPING MACHINE.
APPLICATION FILED JAN. 6, 1913.

1,200,269.

Patented Oct. 3, 1916.
6 SHEETS—SHEET 1.

WITNESSES:
A. H. Edgerton
O. M. McLaughlin

INVENTOR
Daniel H. Talbert

BY
V. H. Lockwood
ATTORNEY

D. H. TALBERT.
CORN POPPING MACHINE.
APPLICATION FILED JAN. 6, 1913.

1,200,269.

Patented Oct. 3, 1916.
6 SHEETS—SHEET 2.

WITNESSES:

INVENTOR
Daniel H. Talbert
BY
V. H. Lockwood
ATTORNEY

D. H. TALBERT.
CORN POPPING MACHINE.
APPLICATION FILED JAN. 6, 1913.

1,200,269.

Patented Oct. 3, 1916.
6 SHEETS—SHEET 3.

WITNESSES:
A. H. Edgerton
O. M. McLaughlin

INVENTOR
Daniel H. Talbert.
BY
V. H. Lockwood
ATTORNEY

D. H. TALBERT.
CORN POPPING MACHINE.
APPLICATION FILED JAN. 6, 1913.

1,200,269.

Patented Oct. 3, 1916.
6 SHEETS—SHEET 4.

WITNESSES:
A H Edgerton
O. M. McLaughlin

INVENTOR
Daniel H. Talbert.
BY
V. H. Lockwood
ATTORNEY

D. H. TALBERT.
CORN POPPING MACHINE.
APPLICATION FILED JAN. 6, 1913.
1,200,269.
Patented Oct. 3, 1916.
6 SHEETS—SHEET 5.
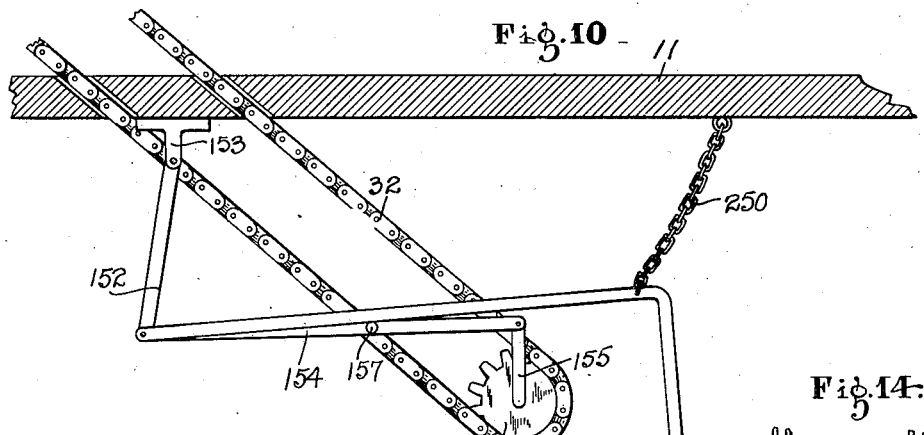
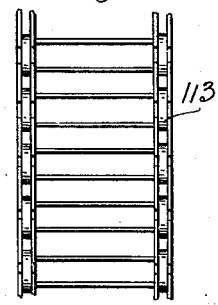
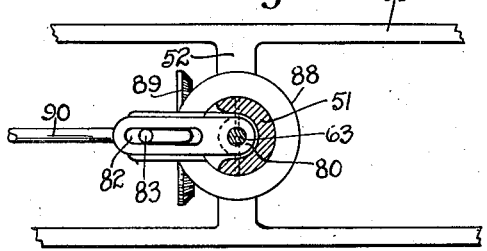
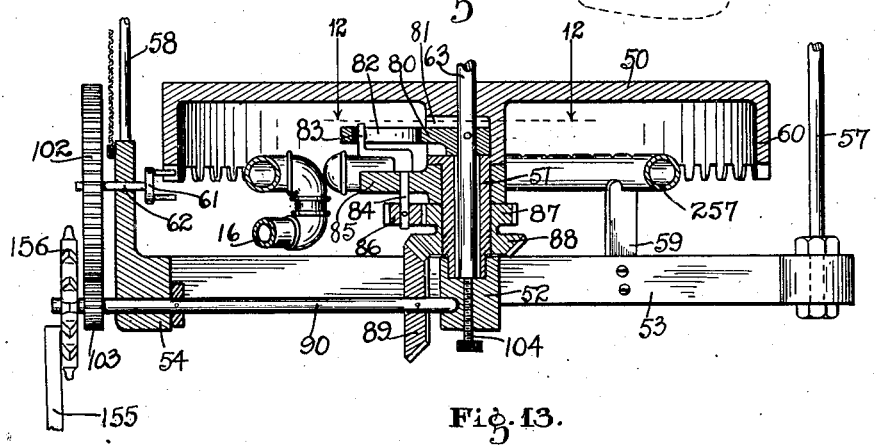
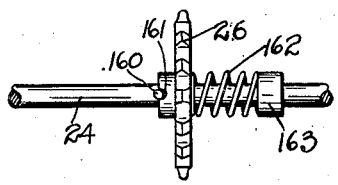
WITNESSES:
A H Edgerton
O. M. McLaughlin
INVENTOR
Daniel H. Talbert.
BY
D. H. Lockwood
ATTORNEY

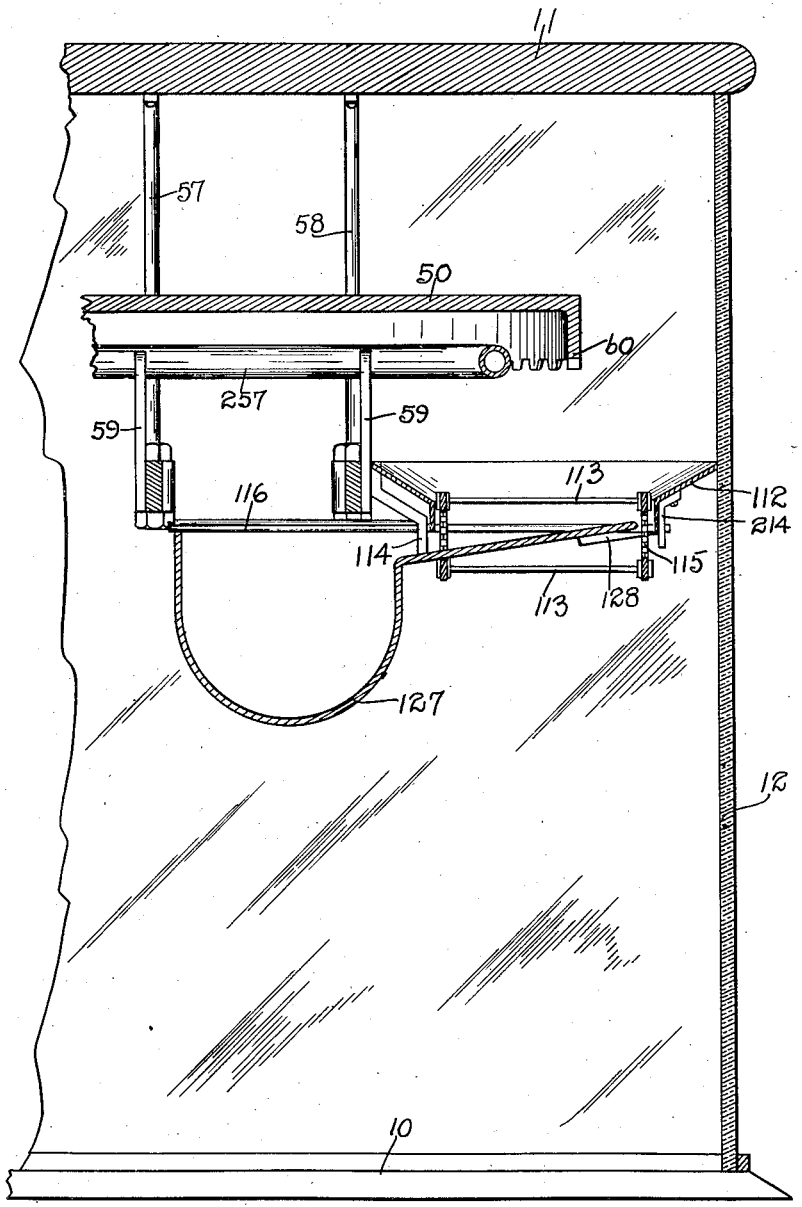

UNITED STATES PATENT OFFICE.

DANIEL H. TALBERT, OF INDIANAPOLIS, INDIANA, ASSIGNOR TO HOLCOMB & HOKE MANUFACTURING COMPANY, OF INDIANAPOLIS, INDIANA.

CORN-POPPING MACHINE.

1,200,269.   Specification of Letters Patent.   Patented Oct. 3, 1916.

Application filed January 6, 1913. Serial No. 740,477.

*To all whom it may concern:*

Be it known that I, DANIEL H. TALBERT, a citizen of the United States, and a resident of Indianapolis, county of Marion, and State of Indiana, have invented a certain new and useful Corn-Popping Machine; and I do hereby declare that the following is a full, clear, and exact description thereof, reference being had to the accompanying drawings, in which like letters refer to like parts.

The object of this invention is to improve the construction and operation of corn popping machines so as to render them more completely automatic and more compact than like machines heretofore devised.

The machine herein disclosed automatically supplies corn to the popper and the popper continuously operates so that while one compartment thereof is being charged, the corn in another will be starting to pop, while the corn in a third is completely popped and the corn in a fourth compartment is being discharged automatically. The charging mechanism is adjustable so that the amount of popcorn discharged into each compartment of the popper may be predetermined.

Another feature of the machine consists in having a popper which has a general rotary movement and at the same time an oscillatory movement whereby the popcorn will be effectively shaken and not permitted to burn. Along with the foregoing, are fingers projecting horizontally into the compartments for assisting in stirring the popcorn. These fingers also assist in discharging the popped corn from a compartment by reason of the oscillatory movement of the popper and fingers, giving to the popcorn a centrifugal movement which causes it to be centrifugally discharged from the popper.

Another feature of the invention consists in automatic means for opening and closing a compartment in the popper for discharging the popped corn. Along with the foregoing is a retarding means or plate for causing the conveyer to feed or discharge the popcorn uniformly to the buttering mechanism.

Another feature of the invention consists in the buttering mechanism wherein the butter is elevated from a receptacle by cups on the ends of vertical revoluble arms, arranged so that when the cup is elevated, it will carry up with it butter which will flow from the cup after the cup is elevated and fall or discharge on the popped corn receptacle where it will mix with the popcorn. Along with the foregoing mechanism is a reciprocatory finger for moving the popcorn in the buttering mechanism and discharging it therefrom.

The nature of the invention will be understood from the accompanying drawings and the following description and claims.

Figure 2:
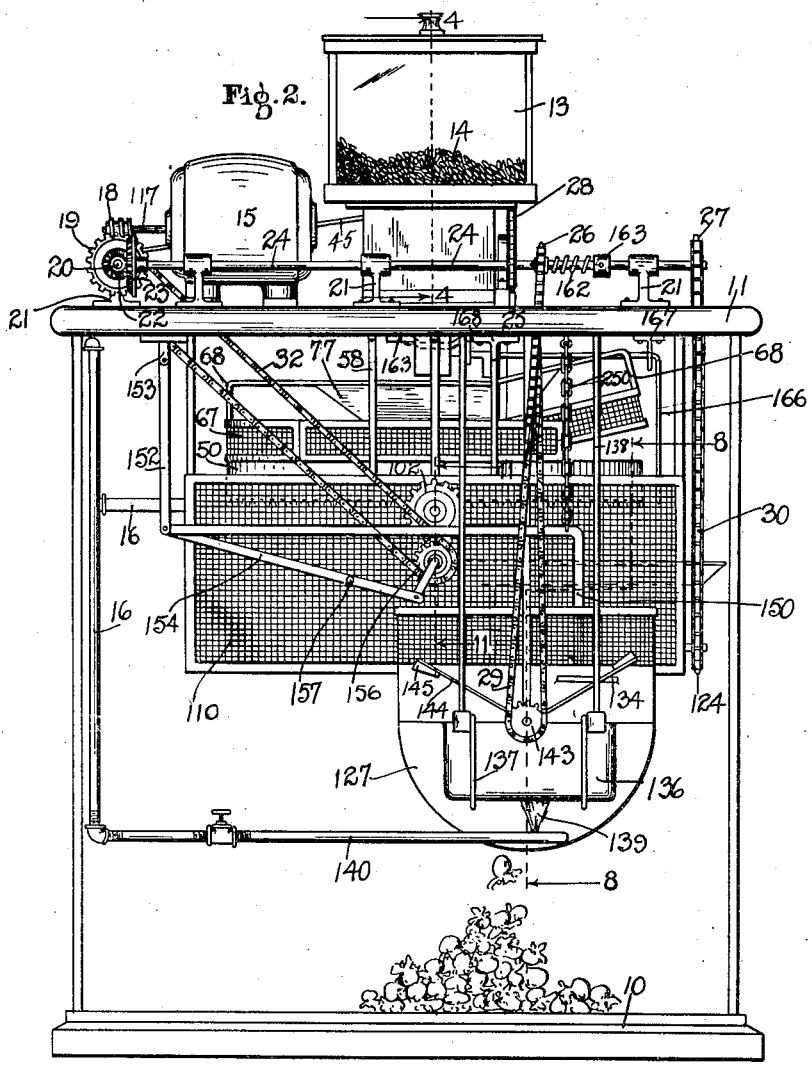
Figure 3:
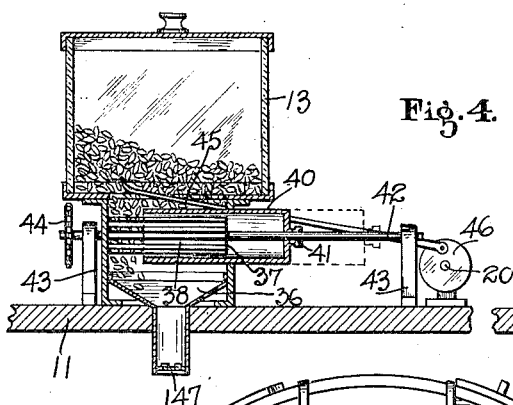
Figure 4:
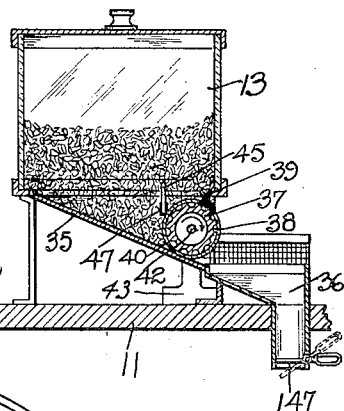
Figure 5:
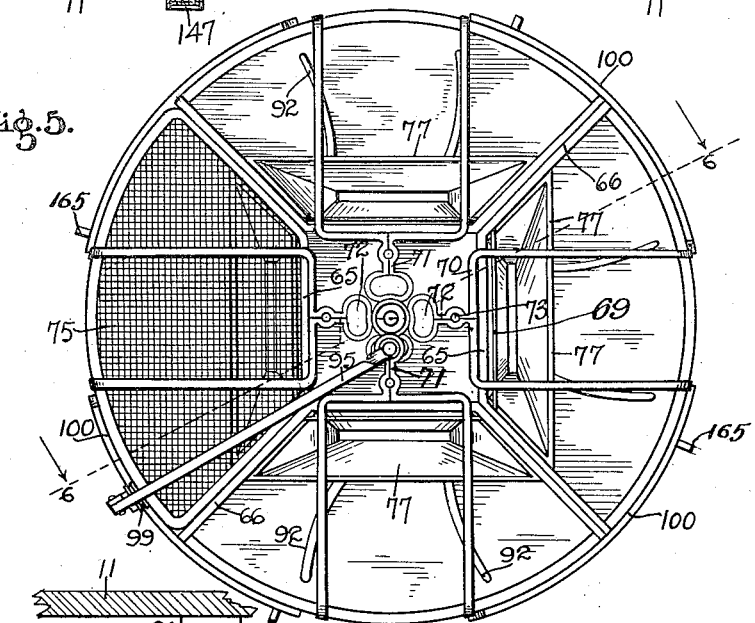
Figure 6:
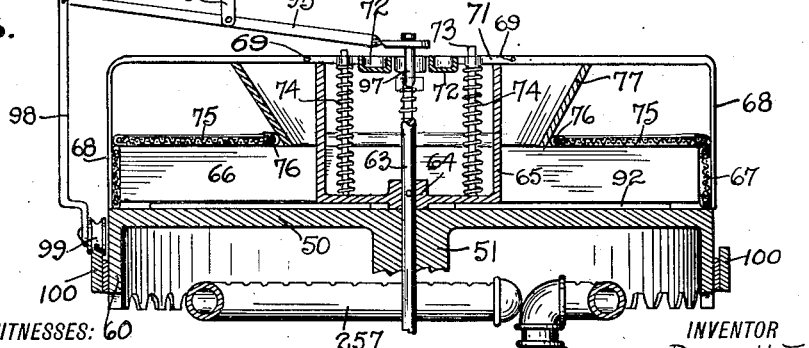
Figure 7:
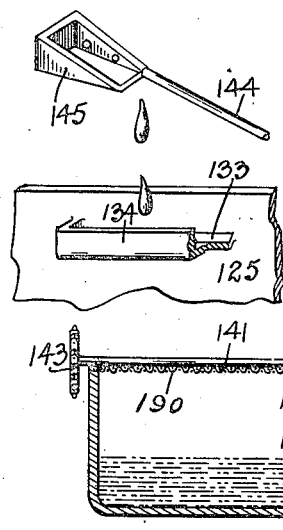
Figure 8:
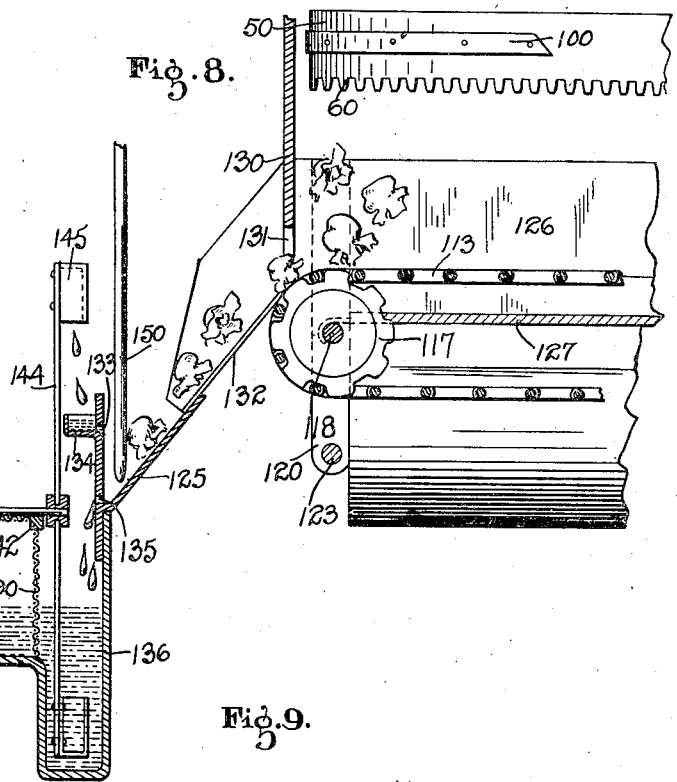
Figure 9:
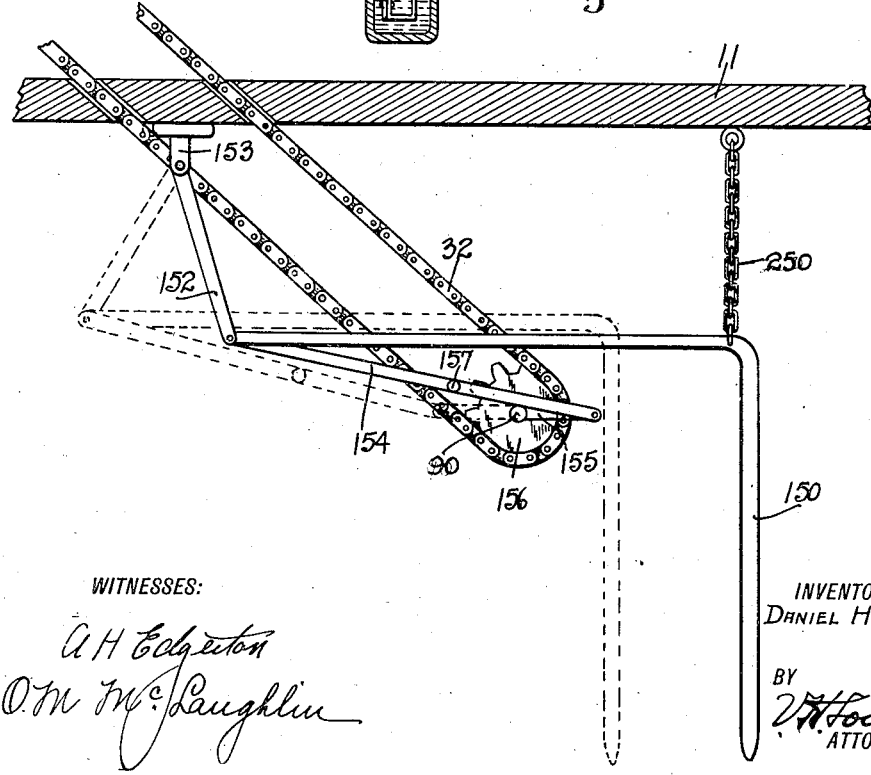

In the drawings, Figure 1 is a front elevation of the machine. Fig. 2 is an elevation of the left-hand side of the machine. Fig. 3 is a vertical section on the line 3—3 of Fig. 1. Fig. 4 is a vertical section on the line 4—4 of Fig. 2. Fig. 5 is a horizontal section on the line 5—5 of Fig. 1. Fig. 6 is a vertical section through a part of the machine on the line 6—6 of Fig. 5. Fig. 7 is a perspective view of two parts of the machine broken away from the remaining parts and illustrating a part of the buttering mechanism. Fig. 8 is a vertical section through a portion of the machine substantially on the line 8—8 of Fig. 2, parts being broken away. Fig. 9 is a vertical section through a part of the machine on the line 9—9 of Fig. 1, parts being omitted, and an altered position of parts being shown by dotted lines. Fig. 10 is the same as Fig. 9, showing the parts in different positions. Fig. 11 is a vertical section through the central portion of the machine on the line 11—11 of Fig. 2. Fig. 12 is a horizontal section on the line 12—12 of Fig. 11. Fig. 13 is a plan view of a portion of the upper right hand part of Fig. 2, showing a part on a larger scale. Fig. 14 is a plan view of a portion of the popcorn conveyer, the ends being broken away. Fig. 15 is a vertical section on line 15—15 of Fig. 1, with parts omitted.

The mechanism of this device is preferably arranged so that it will be entirely visible to purchasers or observers and to that end there is a case made or consisting of a bottom 10 and a top 11 with glass 12 on three sides. The back side is formed of wood 55 with a door 56. This case, as herein shown, is practically cubical. The corn is carried in a receptacle 13 on top of the device and the popcorn 14 is deposited upon the bottom of the case, as shown in Fig. 1.

Upon the top of the case there is mounted an electric motor 15 for furnishing power to the apparatus and it is supplied with a current from any suitable source. There is a ventilator apparatus 17 on the top of the case to let the heat and gases escape.

The motor 15 has a shaft 117 with a worm 18 on it which meshes with a worm gear 19 secured on a transverse shaft 20 mounted in the brackets 21 on top of the case and a beveled gear 22 on the end of the shaft 20 drives a beveled gear 23 on shaft 24 carried in the brackets 21, see Fig. 2. On the shaft 24 there are three sprocket wheels 25, 26 and 27, from which power is transmitted by sprocket chains 28, 29 and 30 to various parts of the machine. There is a sprocket wheel 31 on the shaft 20, see Fig. 1, which drives the sprocket chain 32 for driving another part of the machine.

The corn feeding mechanism, as stated, is mounted on top of the case and appears best in Figs. 1, 3 and 4. As seen in Fig. 4, the bottom of the rectangular corn receptacle 13 has a slanting bottom 35 which slopes donwnwardly toward a hopper 36, but the outlet of the bottom 35 is closed by a cylindrical corn feeder 37. This corn feeder has longitudinal grooves 38 in it which fill with corn and as the feeder is rotated in the direction of the arrow from the inside of the receptacle to the outside, it will discharge the corn by gravity into the hopper 36. A brush 39 on the corn receptacle 13 extends down close to the periphery of the feeder so as to prevent the escape of any corn excepting such as lies within the grooves 38. These grooves are longitudinal, as shown in Fig. 3, and the feeding capacity of said feeder is adjusted by a shield 40 which surrounds the inner side or portion of said feeder and at one end has a sliding bearing 41 on a shaft 42 which carries the feeder, so that the shield 40 is slidable longitudinally and when a large portion of the feeder is uncovered it will feed corn rapidly and when a small portion thereof is uncovered, it will feed the corn relatively more slowly. The shaft 42 is mounted in brackets 43 on the top 11 of the casing and it is driven by the sprocket chain 28, as seen in Fig. 1, and a sprocket wheel 44 on said shaft 42.

There is an agitating arm or rod 45 projecting into the lower part of the corn receptacle to the inside of the feeder so that when it is operated, it will agitate the corn or prevent it from arching. This rod 45, as shown in Fig. 3, is operated by an eccentric 46 secured to the shaft 20 and said rod 45 has bearing or fulcrum where it passes through a small hole at 47 in the side of the lower part of the popcorn receptacle, as shown in Fig. 4. The corn which accumulates in the hopper 36 is discharged into the popper upon the withdrawal of the gate 147, as will hereafter be explained. The lower end of the hopper 36 extends through the top of the case, as seen in Figs. 3 and 4.

The popping mechanism is illustrated in Figs. 5, 6, 11 and 15. There is a popping plate 50 which is intermittently rotated but always in one direction. Said plate has a centrally and downwardly extending sleeve 51 which has bearing at its lower end in the recessed upper portion of a cross bar or bearing 52 secured to a frame 53, see Figs. 11 and 12, which at one end is vertically widened to make the bearing plate 54, which bearing plate 54 is supported by a rod 58 extending down from the top of the case, and the other end of said frame is supported by a plurality of rods 57 also suspended from the top of the case. The popping plate is heated by an annular burner 257 to which gas is supplied through the pipe 16. The burner is supported upon the frame 53 by stands 59 secured to said frame and it is supplied with gas through the pipe 16.

The popping plate has an annular downwardly extending flanged rack bar 60 at its peripheral edge which is engaged and actuated by a pin wheel 61 on a short shaft 62 mounted in the plate 54 and driven by a gear 102, which meshes with a pinion 103 on a shaft 90, see Fig. 11. This pin wheel has two pins so that it gives the popping plate a slight advancing movement on each half rotation of the wheel, so as to cause very slow and intermittent rotary movement of the popping plate.

Upon or immediately above the popping plate, a cover forming a popcorn receptacle is mounted and means provided for causing it to rotate with the popping plate and at the same time oscillate on or above the popping plate. To that end there is a shaft 63 mounted at its upper end in bar 163 and at its lower end in the bearing sleeve 51 of the popping plate so as to rotate therewith and be rotated thereby at the same speed as the popping plate. Above the popping plate it carries a frame consisting of a bottom portion 64 secured to said shaft and which is square and has upwardly extending side plates 65 arranged at right angles to each other, as shown in Fig. 5. There is a popcorn compartment in connection with each side plate 65, making four segmental compartments, as indicated in Fig. 5. These compartments have radially extending side walls 66 secured to the plate 65 and projecting out substantially to the margins of the popping plate and constituting the two end walls of each compartment and the plate 65 constitutes the back wall of each compartment. The outer wall of each compartment consists of wire netting 67 mounted in connection with and supported by the downwardly extending outer ends of a pair of rods 68 which extend upwardly for some distance and then inward horizontally, see Figs. 5 and 6, and are fulcrumed on rods 69 secured on top of the ends of the hopper 77 and their inner ends are connected so that the inner portion and the two outwardly and downwardly extending rods constitute really one rod bent in the shape shown and described, and from the inner end 70 an arm 71 extends and carries at its inner end a bearing cup 72. A rod 73 extends up from the plate 64 loosely through the arm 71 and a spring 74 on said rod 73 presses upwardly on the arm 71 so that its tension is to push the outer ends of the rod 68 downward and close the outer wall of a popcorn receptacle after it has been opened or elevated by means hereafter explained. The top of each compartment consists of a screen 75 hinged at its inner end at 76 to the upper part of the side walls 66 so that said top 75 can be lifted by the bulk of popcorn when the compartment becomes too full of popped corn. In that event the popped corn pushes up on the top 75 somewhat, but the forward end of the top 75 rests upon the outer wall 67 so that when said outer wall is elevated to open the compartment for the discharge of popcorn, as hereafter explained, it will also lift the top 75 with it. There is a hopper 77 secured to each plate 65, said plate forming a part of such hopper and said hopper projects and discharges corn into the compartment with which it is associated, as seen in Fig. 6. The hopper 77 flares upwardly and once during each revolution thereof comes under the hopper 36, see Fig. 4, and thereby receives the charge of corn which drops down through the hopper 77 into the popper compartment. Since there are four compartments, there are four hoppers 77, as shown in Fig. 5.

The popper is revolved as hereafter explained, along with the popping plate, but it is also given an oscillatory or shaking movement by the means shown in Fig. 11. There an arm 80 is secured to the shaft 63 and oscillates in a recess 81 in the sleeve 55. It has in it a longitudinal slot 82 in which the end of a crank 83 projects, and said crank is mounted on a vertical shaft 84, carried in a bearing arm 85 mounted on the sleeve 51 of the popping plate. A pinion 86 on the lower end of the shaft 84 meshes with a gear 87 loosely mounted on the bearing sleeve 51 of the popping plate and connected with a horizontal beveled gear 88 which is driven by a beveled gear 89 on the shaft 90 which is mounted at one end in the cross bar or bearing 52 and at the other end in the plate 54. Therefore, the shaft 84 revolves with the popping plate and at the same time it rotates through the driving means just described and that actuates the crank 83 which causes the oscillation of the arm 80 and through the shaft 63, the popcorn compartments over the popping plate. Hence, said popcorn compartments not only have an intermittently advancing movement, but also a constant reciprocatory or shaking movement. The shaft 90 is driven by a sprocket wheel 156 and chain 32. This latter movement agitates the popcorn which lies upon the popping plate and keeps it from burning; and to aid in this function, there are agitating arms or fingers 92 secured to the underside of the plate 64 and projecting radially outward almost to the edge of the popping plate. As seen in Fig. 5, there are two of these agitating fingers 92 for each compartment and the oscillating arm 80 causes the oscillation of these agitating fingers 92 so that they have the same movement as the side walls of the compartments and altogether cause the agitation and discharge of the corn.

As observed in Fig. 5, the side walls of the compartments and also the fingers 92 extend radially and, therefore, flare outwardly so that they also, by reason of their oscillation, constitute the discharging means for discharging the popcorn outwardly and beyond the periphery of the popping plate, when the corn is fully popped, as will be more fully explained hereafter.

The machine runs constantly and, therefore, as a compartment comes in the proper position, its hopper 77 will receive a charge of corn which will drop down on the popping plate and be held thereon by the walls of the compartment and as the popper revolves, the corn will become heated and when it travels 90°, it will begin to pop and when it reaches 180°, it will be nearly all popped and when it reaches 270°, it will be fully popped and at that point the popcorn is discharged.

In order to discharge the popcorn, it is necessary that the outer wall of the compartment be lifted or tilted upwardly, as shown in Fig. 2, at the right-hand side thereof. This is accomplished by means shown in Fig. 6. A lever 95 is fulcrumed between its ends to a bracket 96 extending down from the top 11. The inner end of the lever carries a suspended finger 97 which is adapted, when the rod 95 is in its truly horizontal and normal position, to be elevated above the position shown in Fig. 6, so as to clear the bearing cups 72 and travel over them. The lever 95 is actuated by a bar 98 which extends down and carries on its lower end a roller 99 in the path of a cam bar 100 which is secured to the periphery of the rack bar 60 of the popping plate 50. The cam bar is shown in Figs. 5 and 6 and the side elevation appears in Fig. 1. Both ends are beveled so that as the popping plate revolves, the cam bar 100 will travel under the roller 99 and will lift it to the position shown in Fig. 6, and that forces the inner end of the lever 95 downward and the finger 97 thereon will enter a cup 72 and press it downward and thus it will tilt the frame made up of the arm 71, rods 68 and outer wall 67 of the compartment and open said compartment, as shown in Figs. 1 and 2. It merely elevates the outer wall so that the oscillatory movement of the side walls 53 of the compartment and the agitating fingers 92 will gradually, but completely, push the popcorn outwardly over the edge of the popping plate. The cam bar 100 is long enough to hold the compartment open during an entire one fourth revolution of the popping plate and for a period which will permit the discharge of the popcorn by the means suggested. Then as the cam bar 100 travels beyond the roller 99, the latter will drop down and bring the lever 95 to practically a horizontal position and lift the bearing finger 97 above the bearing cup 72 until the next cam bar 100 comes along. Hence, there are four of these cam bars 100, one for each compartment, but they are not located directly opposite the compartment which each one opens, as appears in Fig. 1, so that they do not interfere with the fall of the popcorn over the edge of the popping plate.

After the popcorn has been discharged and the front wall and top of the compartment have been let down by reason of the cam bar 100 having passed beyond the roller 99, a pin 165 projecting from the succeeding cam bar 100 engages the lower end of a rod 166, as shown in Fig. 1. This rod has an upwardly extending portion which passes through a bracket 167 in the top of the case and then a horizontal rearwardly extending portion which passes through a bracket 168 like the bracket 167 and directly behind it, see Fig. 2, and then an inner horizontal end which is flexibly connected with the gate 147, see Fig. 4, whereby said gate is tilted, as seen in the dotted lines. When the pin 165 disengages the rod 166, the gate 147 is closed by the gravity of said rod.

The shaft 63 which supports the popper or popcorn compartments is vertically adjustable by a set screw 104 in the cross bar 52 of the frame 53 so that there will not be any appreciable friction between the hopper and popping plate during the oscillation of the former.

On the right and left-hand sides of the popper mechanism there are two vertical screens 110 and 111 which are secured to the rods 57 and 155 which support the frame 53 and the screens extend up far enough to confine the popcorn and keep it from jumping out. As the popcorn is discharged from the popper over the edge of the popper plate, it falls on the slanting plate 112 at the front side of the machine and rolls inwardly upon an endless conveyer 113. The plate 112 is supported by a bracket 114 and the conveyer operates on sprocket wheels 115 carried by shaft 116 in brackets 114 and 214 at the right-hand end, see Fig. 1, and at the other end the conveyer, as shown in Fig. 8, operates over a pair of sprocket wheels 117 on a shaft 118 in the vertical plates 119 and bracket 120 suspended from the plate 112. The sprocket wheels 117 are driven by a gear 121 which meshes with a gear 122 on a shaft 123 mounted in the same vertical plates 119 and 120 and which carries a pinion 124 driven by the chain 30, see Figs. 1 and 15. The conveyer is operated so that the upper side thereof moves to the left, as shown in Figs. 1 and 8, and discharges the popped corn into a buttering hopper 125, and causes the unpopped corn to pass through said conveyer into a receptacle 127 suspended below the conveyer on brackets 128 secured to the plate 112 and slidably suspended from the shaft 116 at one end and shaft 118 at the other end so the receptacle can be readily removed.

The popcorn conveyed to the conveyer 113 is retarded by a plate 130, see Fig. 8, which has an opening or slot 131 in the lower part of it so that only a uniform quantity of popcorn can pass through and slide down over a chute 132 into the buttering hopper 125.

The buttering mechanism is shown in Fig. 7. The buttering hopper 125 has a vertical side wall against which the butter enters through an opening 133 from a trough 134 on the outside of the vertical wall of the buttering hopper. The butter runs down on the inner surface of said wall and comes in contact with the popcorn and the surplus butter drains through the opening 135 at the lower end of the hopper back into the buttering tank 136.

The butter tank has a shallow portion and also a deeper portion, as shown in Fig. 8, the deeper portion being next to the buttering hopper 125. It is supported by a pair of fingers 137 which project under the same and which extend over the lower end of the rods 138 suspended from the top of the case, as shown in Figs. 1 and 2. Therefore, the buttering tank is readily removed. The butter in the tank is heated by a gas jet 139 from a gas pipe 140 which extends from the gas pipe 16.

The butter is elevated from the tank and discharged into the trough 134 by the means shown in Figs. 1, 7 and 8. A shaft 141 is mounted on a bar 142 and carries a sprocket wheel 143 driven by the chain 29. A brace 151 extends from the top of the case down to the shaft 141 and supports the outer end of it. Said shaft has a number of radially extending arms 144 on the outer end of which cups 145 are secured, the inner end of said cups being arranged as shown in Fig. 7. The trough 134 is above the deeper portion of the tank 136, and the cups 145 are adapted to revolve through the buttering tank and pick up some of the butter and when it is revolved and carried upward the butter runs out of the cup and drops into the trough 134 and enters the buttering hopper, as heretofore explained. The butter tank is suitably covered by a screen 190 to prevent any popcorn falling into the butter.

The popcorn is fed out of the hopper and moved and mixed with the butter by a finger 150 which is the turned-down end of a rod, the upper portion of which is horizontal and is pivoted to the lower end of the connecting rod 152 which is pivoted to a bracket 153 secured to the top of the case, as shown in Figs. 2 and 9. Movement is given to said finger 150 by a connecting bar 154 which is pivoted to the ends of the finger 150 and the bar 152 and also is pivoted to a crank arm 155 on the rigid axle of the sprocket wheel 156 which is driven by the chain 32. This gives a substantially horizontal reciprocating movement to the finger 150, as indicated by dotted lines in Fig. 9, and the finger 150 is elevated in its forward movement by a pin 157 on the bar 154 which, if said bar moves upward, engages the horizontal portion of the finger 150 and lifts it. Therefore, as the sprocket wheel 156 rotates, the end of the finger 150 is moved substantially as shown by dotted lines 158 in Fig. 10. Therefore, this mechanism gives the finger 150 a raking movement substantially the same as the raking movement of the human finger, as it passes above the corn which is in the buttering hopper 125 and beyond the corn and then comes down beyond the corn and drags backwardly through the corn and carries the corn with it and wipes it against the buttered surface of the vertical wall of the buttering hopper and discharges the corn through the open end of the buttering hopper. A chain 250 at times supports and limits the movement of finger 158.

To prevent parts from breaking if the popcorn should choke against the holding back plate 130 as it leaves the conveyer 113, the shaft 24, as shown in Fig. 2, is arranged as shown in Fig. 13, with a pin 160 adapted to engage a notch 161 in the hub of the sprocket wheel 27, under normal conditions and the parts are kept in such positions by a spring 162 which lies against a collar 163 on the shaft 24 and presses the hub of the wheel 26 against the pin 160. If the popcorn should choke the conveyer, the shaft 24 could turn without the sprocket wheel 26 turning, the sprocket wheel 26 being held by the popcorn conveyer in spite of the friction engagement of the hub with the pin 160 under the action of the spring 162 so that the wheel 26 could remain stationary until the clog was removed.

I claim as my invention:

1. In a corn popping machine, a circular rimless popping plate, and radially extending means oscillatory thereon, whereby said radially extending means will agitate and discharge the popped corn over the margin of the plate.

2. In a corn popping machine, a revoluble rimless popping plate, and radially extending means oscillatory thereon, whereby said radially extending means will agitate and discharge the popped corn over the margin of the plate.

3. In a corn popping machine, a rotary popping plate, means for feeding thereto the corn to be popped, and means operated by said popping plate for regulating the feed of the popcorn from said feeding means.

4. In a corn popping machine, a rimless popping plate, radially extending means immediately above said plate, and a cover for said popping plate adapted to be raised during the discharge of the popped corn, said cover and radially extending means being oscillatory.

5. In a corn popping machine, a rimless popping plate, radially extending means immediately above said plate, and a cover for said popping plate adapted to be raised during the discharge of the popped corn, said cover and radially extending means being revoluble.

6. In a corn popping machine, a popping plate, radially extending means immediately above said plate, and a cover for said popping plate adapted to be raised during the discharge of the popped corn, said cover and radially extending means being simultaneously revoluble and oscillatory.

7. In a corn popping machine, a popping plate, a cover therefor having a central portion with radial partitions to form compartments and each compartment being closed by a marginal door and top plate, a hinge for hinging said top plate in each compartment to said central portion of the cover, and means for tilting open said hinged portions of the cover successively.

8. In a corn popping machine, a rotatable popping plate, a popper on said popping plate, means carried by said popping plate for causing an oscillatory movement of said popper independently of the popping plate.

9. A corn popping machine including a popping plate, means for rotating it, a central bearing therefor, a popper upon said popping plate, a shaft in said popping plate bearing for supporting and moving said popper, and means mounted in connection with said bearing for giving said shaft an oscillatory movement as the popping plate and its bearing rotate.

10. A corn popping machine including a popping plate, means for rotating it, a sleeve bearing for supporting said popping plate having a central opening therein and also a recess in the upper part thereof, a vertical shaft in said bearing projecting above the popping plate, a popper mounted on said shaft above the popping plate, an arm secured to said shaft in the recess in said bearing, and means revolved with said bearing for oscillating said arm.

11. In a corn popping machine, a heating means, a popping plate above the heating means with a supporting sleeve extending below the heating means, a bearing below the heating means for supporting said popping plate, a cover for said popping plate located above the same, a shaft extending down from said cover through said supporting sleeve to a point below the heating means, bearings below the heating means for said sleeve and shaft, and means below the heating means for operating said popping plate and the cover therefor.

12. A corn popping machine including a popping plate, means for rotating it, a central bearing therefor, a popper upon said popping plate, a shaft in said popping plate bearing for supporting and moving said popper, means mounted in connection with said bearing for giving said shaft an oscillatory movement as the popping plate and its bearing revolves, means in which the lower end of said popping plate bearing is mounted, and a set screw in said means for vertically adjusting said shaft to reduce the frictional engagement between the popper and popping plate.

13. A corn popping machine including a rotatable popping plate with a downwardly extending flanged annular rack, a pin wheel engaging said rack for intermittently giving rotary movement to said popping plate, and means for oscillating said popper on said popping plate.

14. A corn popping machine including a case with a top, a frame suspended from said case, a popping plate mounted in said frame, a burner carried by said frame below said popping plate, and a popper mounted above said popping plate.

15. A corn popping machine including a popping plate, a shaft concentric with said popping plate, a frame secured on said shaft with vertical plates, a popper compartment secured to said plates, and means for moving said popper structure on said popping plate.

16. A corn popping machine including a popping plate, a cover mounted to oscillate thereon and consisting of a number of compartments with radial partitions between them, and radial agitating fingers in each compartment, whereby the oscillation of the cover will cause a discharge of the popcorn over the edge of the popping plate.

17. A corn popping machine including a case with a top, a frame suspended from said case, a popping plate mounted in said frame, a cover mounted above said popping plate, means for rotating the popping plate and cover, and means for oscillating the cover.

18. A corn popping machine including a popping plate, a cover mounted to oscillate thereon and consisting of a number of compartments with radial partitions between them and with movable outer walls, radial agitating fingers in each compartment, whereby the oscillation of the cover will cause a discharge of the popcorn over the edge of the popping plate, and means for automatically opening the outer wall of each compartment for permitting such discharge.

19. A corn popping machine including a popping plate, a shaft concentric therewith, a frame secured to the shaft with vertical plates which form the inner walls of the popping compartments, radial plates extending from each end of said vertical plates to form the ends of the compartments, means for forming the outer wall and top of each compartment, and means for elevating said outer wall for the discharge of the popcorn.

20. A corn popping machine including a popping plate, a shaft concentric therewith, a frame secured to the shaft with vertical plates which form the inner walls of the popping compartments, radial plates extending from each end of said vertical plates to form the ends of the compartments, means for forming the outer wall and top of each compartment, and means actuated by the popping plate for opening the outer wall of each compartment for the discharge of the popcorn.

21. A corn popping machine including a popping plate, a shaft concentric therewith, a frame secured to the shaft with vertical plates which form the inner walls of the popping compartments, radial plates extending from each end of said vertical plates to form the ends of the compartments, means for forming the outer wall and top of each compartment, a lever connected with the outer wall of each compartment and pivoted between its ends so that the ends of all of the levers will be near the center of the popper, and means mounted in a fixed position and adapted to be actuated by the popping plate in its revolution for successively actuating said levers and raising the outer walls to open the compartments.

22. A corn popping machine including a popping plate, a shaft concentric therewith, a frame secured to the shaft with vertical plates which form the inner walls of the popping compartments, radial plates extending from each end of said vertical plates to form the ends of the compartments, means for forming the outer wall and top of each compartment, a lever connected with the outer wall of each compartment and pivoted between its ends so that the ends of all of the levers will be near the center of the popper, a lever pivoted between its ends to a stationary part with one end in position to engage and actuate said popper levers successively, a bar extending down from the outer end of said actuating lever and carrying a roller, and a cam bar on said popping plate for engaging said roller and actuating said actuating lever for opening the compartments to discharge the popcorn from each compartment at the proper place.

23. A corn popping machine including a popping plate, a shaft concentric therewith, a frame secured to the shaft with vertical plates which form the inner walls of the popping compartments, radial plates extending from each end of said vertical plates to form the ends of the compartments, means for forming the outer wall and top of each compartment, means actuated by the popping plate for opening the outer wall of each compartment for the discharge of the popcorn, and means for causing each compartment to close after it has been opened.

24. A corn popping machine including a popping plate, a shaft concentric therewith, a frame secured to the shaft with vertical plates which form the inner walls of the popping compartments, radial plates extending from each end of said vertical plates to form the ends of the compartments, means for forming the outer wall and top of each compartment, a lever connected with the outer wall of each compartment and fulcrumed between its ends and provided with a cup on its inner end, a rod extending through the inner end of each lever, a spring on said rod pushing upward against said lever for closing the compartment, an actuating lever mounted between its ends in a fixed position, a finger pivotally mounted on the inner end of said actuating lever for engaging and bearing down on the cups of said popper levers as they come successively into position therefor, a rod extending down from the outer end of the actuating lever, a roller on the lower end of said rod, and a cam bar on the popping plate in position to engage said roller and actuate said actuating lever for discharging the popcorn from a compartment at the proper place.

25. In a corn popping machine, a popping mechanism, a buttering mechanism, a conveyer for conveying the popcorn after it leaves the popper to said buttering mechanism, and a plate for retarding said popcorn before it leaves said conveyer whereby the popcorn will be fed to the buttering mechanism with uniformity.

26. In a corn popping machine, a buttering mechanism having a hopper which receives the popcorn, means for supplying liquid butter to the wall of the hopper, and a reciprocating finger adapted to rake the popcorn over said buttered surface and discharge the same from the hopper.

27. In a corn popping machine, a buttering mechanism having a hopper which receives the popcorn, means for supplying liquid butter to the wall of the hopper, a reciprocating finger adapted to rake the popcorn over said buttered surface and discharge the same from the hopper, and means for actuating said finger so that on its return movement it will pass above the popcorn in said buttering hopper.

28. In a corn popping machine, a buttering mechanism having a hopper which receives the popcorn, said hopper having a vertical wall, a butter trough on the outside of said wall with an opening therefrom through said wall and an outlet from the lower part of said hopper, and means for moving the popcorn in the hopper over the buttered surface of said vertical wall.

29. In a corn popping machine, a buttering mechanism including a tank for the butter, a buttering hopper at one side of said tank into which the popcorn enters, and revolving cups adapted to convey the butter from the tank to the buttering hopper.

30. In a corn popping machine, a buttering mechanism including a tank for the butter, a buttering hopper at one side of said tank into which the popcorn enters, a trough on the outside of the buttering hopper with an opening leading into the hopper, and revolving cups for conveying the butter from the tank and discharging the same in the trough.

31. In a corn popping machine, a buttering mechanism including a tank for the butter, a buttering hopper at one side of said tank into which the popcorn enters, a trough on the outside of the buttering hopper with an opening leading into the hopper, a shaft mounted over said tank, arms radiating therefrom, and cups with their inner ends open and secured to the ends of said arms so that in their revolutions they will pass through the butter in the tank and fill and as they pass upward they move over said trough and as they tilt, the butter will run therefrom into the trough.

In witness whereof, I have hereunto affixed my signature in the presence of the witnesses herein named.

DANIEL H. TALBERT.

Witnesses:
J. H. WELLS,
O. M. McLAUGHLIN.